United States Patent
Pyo

(10) Patent No.: US 8,872,993 B2
(45) Date of Patent: Oct. 28, 2014

(54) LIQUID CRYSTAL DISPLAY APPARATUS

(75) Inventor: Si-Baek Pyo, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 103 days.

(21) Appl. No.: 13/274,721

(22) Filed: Oct. 17, 2011

(65) Prior Publication Data

US 2012/0182515 A1 Jul. 19, 2012

(30) Foreign Application Priority Data

Jan. 19, 2011 (KR) .................. 10-2011-0005387

(51) Int. Cl.
*G02F 1/1333* (2006.01)
*G02F 1/1345* (2006.01)
*G02F 1/1335* (2006.01)

(52) U.S. Cl.
CPC ...... *G02F 1/133615* (2013.01); *G02F 2201/42* (2013.01); *G02F 1/13452* (2013.01)
USPC .............................. 349/58; 349/60; 349/150

(58) Field of Classification Search
USPC ....................................... 349/150, 58, 59, 60
See application file for complete search history.

(56) References Cited

U.S. PATENT DOCUMENTS

| | | | |
|---|---|---|---|
| 6,597,416 B1* | 7/2003 | Momose | 349/60 |
| 6,870,590 B2* | 3/2005 | Shoji | 349/152 |
| 2008/0218655 A1* | 9/2008 | Won et al. | 349/58 |
| 2009/0180047 A1* | 7/2009 | Kim et al. | 349/58 |
| 2009/0283312 A1* | 11/2009 | Takahashi | 174/260 |

FOREIGN PATENT DOCUMENTS

| | | |
|---|---|---|
| KR | 10-2008-0057524 A | 6/2008 |
| KR | 10-2008-0084350 A | 9/2008 |
| KR | 10-2008-0096077 A | 10/2008 |
| KR | 10-2009-0026686 A | 3/2009 |
| KR | 10-2009-0061459 A | 6/2009 |

* cited by examiner

*Primary Examiner* — Edward Glick
*Assistant Examiner* — Mark Teets
(74) *Attorney, Agent, or Firm* — Lee & Morse, P.C.

(57) ABSTRACT

A liquid crystal display (LCD) apparatus includes a liquid crystal panel, a printed circuit board (PCB) that generates a driving signal to drive the liquid crystal panel, and a backlight unit between the liquid crystal panel and the PCB. The backlight unit has a through hole formed therein. The LCD also includes a flexible printed circuit (FPC) electrically connected to a driving integrated circuit (IC) of the liquid crystal panel and electrically connected to the PCB in the through hole.

19 Claims, 5 Drawing Sheets

LIQUID CRYSTAL DISPLAY APPARATUS

CROSS-REFERENCE TO RELATED PATENT APPLICATION

This application claims the benefit of Korean Patent Application No. 10-2011-0005387, filed on Jan. 19, 2011, in the Korean Intellectual Property Office, the disclosure of which is incorporated herein in its entirety by reference.

BACKGROUND

A liquid crystal display (LCD) apparatus may be a thin flat panel display apparatus that has light-weight and low power consumption and is used in various application fields.

SUMMARY

Embodiments may be realized by providing a liquid crystal display (LCD) apparatus including a liquid crystal panel; a printed circuit board (PCB) generating a driving signal that is necessary to drive the liquid crystal panel; a backlight unit disposed between the liquid crystal panel and the PCB and having a through hole formed thereon; and a flexible printed circuit (FPC) electrically connected with a driving integrated circuit (IC) of the liquid crystal panel, and electrically connected with the PCB in the through hole.

The through hole may be formed to overlap a predetermined portion of the PCB and to overlap a predetermined portion of the FPC.

A conductive member may be disposed in the through hole and may contact the FPC and the PCB.

The conductive member may be separately formed from the FPC, the backlight unit, and the PCB.

The conductive member may be integrally formed with one of the FPC, the backlight unit, and the PCB.

A conductive layer may be formed along an inner circumference of the through hole, a first projection part including a conductive material and contacting the conductive layer may be formed in an end of the FPC so as to correspond to the through hole, and a second projection part including a conductive material and contacting the conductive layer may be formed in an end of the PCB so as to correspond to the through hole.

The first projection part and the second projection part may be disposed in the through hole and may contact the conductive layer.

A projection part including a conductive material may be formed in an end of the FPC so as to correspond to the through hole, a slot including a conductive material may be formed in an end of the PCB so as to correspond to the through hole, and the projection part may be combined with the slot in the through hole.

An elastic member including a conductive material may be formed in an end of the FPC so as to correspond to the through hole, a pad including a conductive material may be formed in an end of the PCB so as to correspond to the through hole, and the elastic member may contact the pad in the through hole.

The backlight unit may include a light source unit and a mold frame, and the through hole may be formed in the mold frame.

The FPC may be bent at a side surface of the liquid crystal panel, and a bent portion of the FPC may be disposed between the liquid crystal panel and the backlight unit.

The bent portion of the FPC which is disposed between the liquid crystal panel and the backlight unit may be disposed in a region corresponding to the through hole.

BRIEF DESCRIPTION OF THE DRAWINGS

Features will become apparent to those of ordinary skill in the art by describing in detail exemplary embodiments thereof with reference to the attached drawings in which.

DETAILED DESCRIPTION

Figure 1:
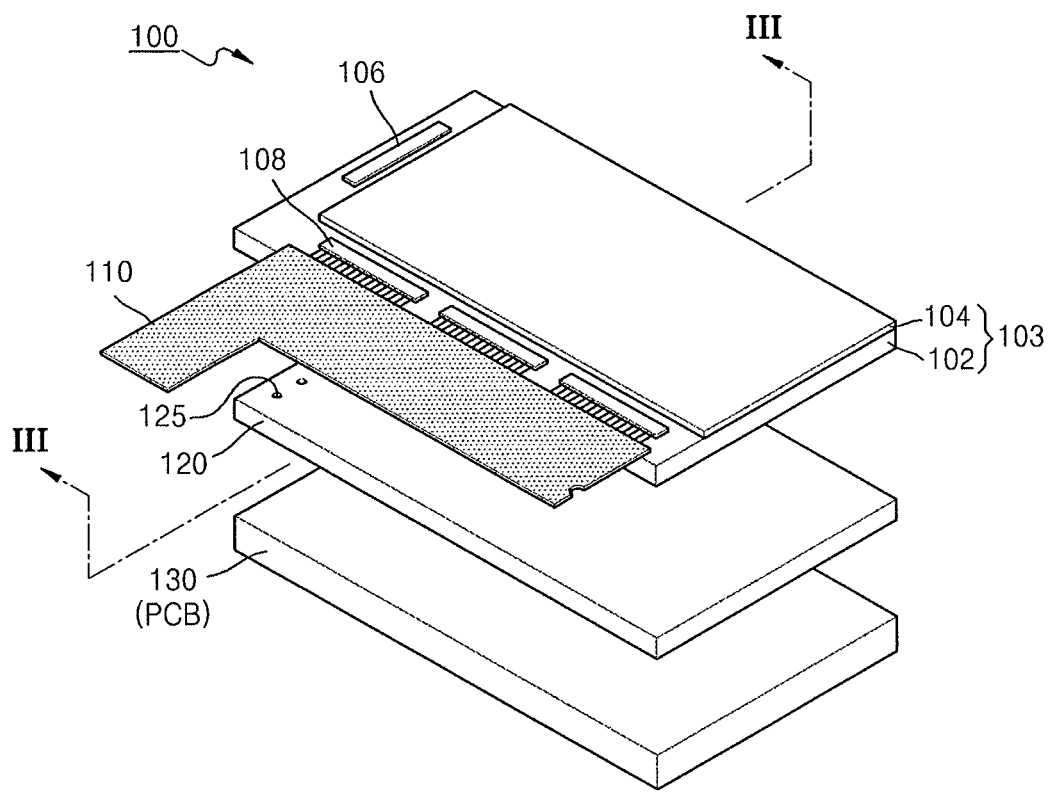
FIG. 1 illustrates an exploded perspective view of a liquid crystal display (LCD) apparatus, according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will also be understood that when an element is referred to as being "between" two elements, it can be the only element between the two elements, or one or more intervening elements may also be present. Like reference numerals refer to like elements throughout. Hereinafter, the embodiments will be described in detail by explaining exemplary embodiments with reference to the attached drawings.

Figure 2:
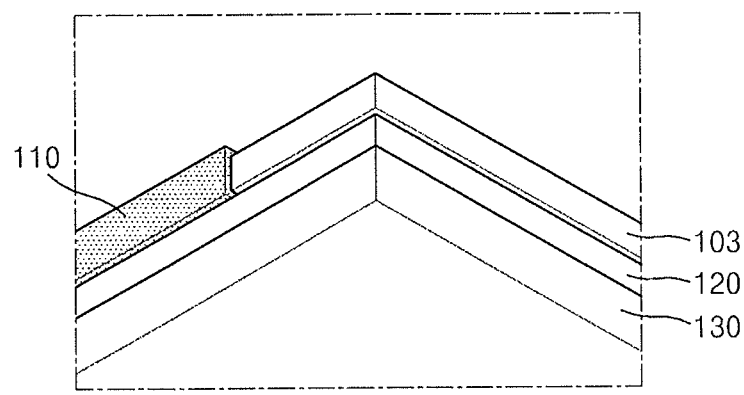
FIG. 2 illustrates a perspective view showing a portion of the LCD apparatus of FIG. 1.
Figure 3:
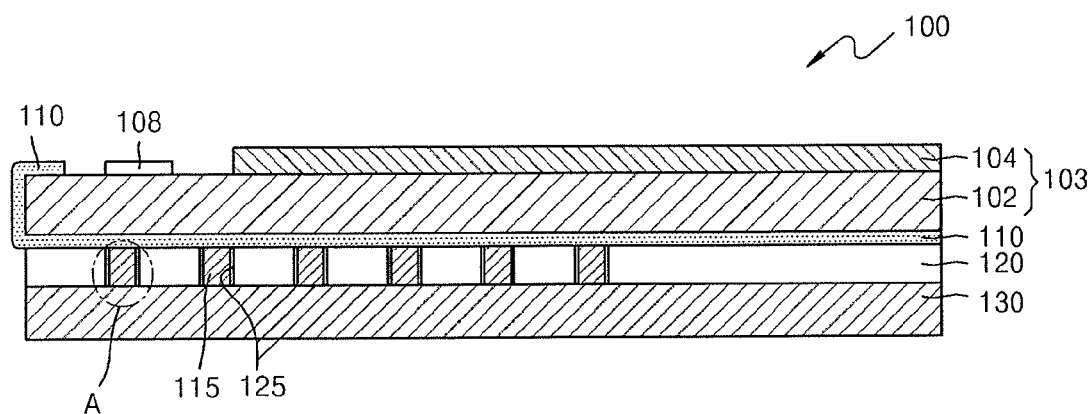
FIG. 3 illustrates a cross-sectional view of the LCD apparatus of FIG. 1, taken along a line III-III.
Figure 4:
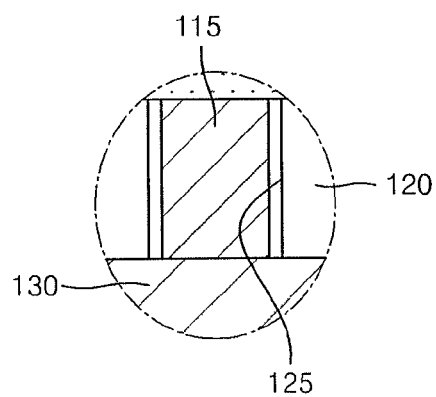
FIG. 4 is a magnified view of a portion A in FIG. 3.

FIG. 1 illustrates an exploded perspective view of a liquid crystal display (LCD) apparatus 100 according to an exemplary embodiment. FIG. 2 illustrates a perspective view showing a portion of the LCD apparatus 100 of FIG. 1. FIG. 3 illustrates a cross-sectional view of the LCD apparatus 100 of FIG. 1, taken along a line FIG. 4 is a magnified view of a portion A in FIG. 3.

Referring to FIGS. 1 through 4, the LCD apparatus 100 may include a liquid crystal panel 103, a printed circuit board (PCB) 130, a backlight unit 120, and a flexible printed circuit (FPC) 110.

The liquid crystal panel 103 may include a lower substrate 102, an upper substrate 104, and liquid crystal (not shown). The liquid crystal may be disposed between the lower substrate 102 and the upper substrate 104. At least one of the lower substrate 102 and the upper substrate 104 may be formed of a transparent material, e.g., a glass containing $SiO_2$ as a main component or a transparent plastic material.

Although not illustrated in FIGS. 1 through 4, a thin film transistor (TFT), a color filter, a black matrix and the like may be formed on one of the lower substrate 102 and the upper substrate 104. According to an exemplary embodiment, a signal wiring including a data line, a gate line or the like may be formed on the lower substrate 102, and the TFT may be formed in a cross point of the data line and the gate line. A pixel electrode may be formed in a pixel region between the data line and the gate line, and a common electrode facing the pixel electrode may be formed on the upper substrate 104 or the lower substrate 102 according to the manner by which an electric field is applied to the liquid crystal. A pad region on which data lines and gate lines, respectively, are connected may be formed on a side of the lower substrate 102. Driving integrated circuits (ICs) 106 and 108 may be mounted on the pad region so as to apply a driving signal to the TFT. The driving IC 106 may be a gate driving IC. The driving IC 108 may be a data driving IC. The driving IC 108 may supply a data signal to the data lines in response to a data control signal generated by the PCB 130. The driving IC 108 may be formed by using one of various methods, e.g., the driving IC 108 may be formed according to a chip on glass (COG) method.

The driving IC 106 may receive a gate control signal, which may be generated by the PCB 130, from the driving IC 108 via driving lines mounted by using a line on glass method. The driving IC 106 may supply a scan signal to the gate lines in response to the gate control signal.

Although not illustrated, an upper polarizing sheet may be adhered to a top surface of the upper substrate 104, and a lower polarizing sheet may be adhered to a bottom surface of the lower substrate 102.

The backlight unit 120 may include a light source unit (not shown) disposed on a bottom surface of the liquid crystal panel 103. The light source unit may generate light. The backlight unit 120 may include a mold frame (not shown) disposed on an outer side of the light source unit. The backlight unit 120 may include a through hole 125. The backlight unit 120 may have at least one through hole 125. According to an exemplary embodiment, the backlight unit 120 may have a plurality of the through holes 125. For convenience of the manufacturing procedure and the design, the through hole 125 may be formed in the mold frame of the backlight unit 120. A chassis (not shown) for supporting and/or accepting the backlight unit 120, a cover or the like may be further disposed in LCD apparatus 100.

The PCB 130 may be disposed on a bottom surface of the backlight unit 120, that is, the PCB 130 may be disposed on an opposite surface of a surface of the backlight unit 120 which faces the liquid crystal panel 103.

An end of the FPC 110 may be electrically connected to the driving IC 108. For example, a metal layer of the end of the FPC 110 may be electrically connected with a pad electrode of the driving IC 108 via, e.g., an anisotropic conductive film (ACF). The FPC 110 may have various types, e.g., the FPC 110 may include a base film layer formed of an insulating material, the metal layer having a predetermined width on the base film layer, and a cover layer formed as an insulating layer on the metal layer.

The FPC 110 may be electrically connected with the PCB 130. The FPC 110 may be bent at a side end of the liquid crystal panel 103. The FPC 110 may include a bent portion that may be disposed between the liquid crystal panel 103 and the backlight unit 120, e.g., the bent portion may extend from a first surface of the liquid crystal panel 103 to a second surface of the backlight unit 120 such that a portion of the FPC 110 may be disposed between the liquid crystal panel 103 and the second surface of the backlight unit 120. The FPC 110 and the PCB 130 may be electrically connected to each other in, e.g., via, the at least one through hole 125 of the backlight unit 120.

The electrical connection between the FPC 110 and the PCB 130 will now be described in detail. Referring to FIGS. 2 and 3, the at least one through hole 125 may be formed to overlap a predetermined portion of the PCB 130. For example, a plurality of through holes 125 may be arranged along one side of the backlight unit 120 to overlap one side of the PCB 130. The bent portion of the FPC 110, which may be disposed between the liquid crystal panel 103 and the backlight unit 120, may be formed to overlap the through hole 125. By doing so, the PCB 130 and the FPC 110 may correspond to each other in the at least one through hole 125. For example, a conductive member 115 may be disposed in each of the through holes 125 formed in the backlight unit 120. The conductive member 115 may contact the PCB 130 and the FPC 110, so that the PCB 130 and the FPC 110 may be electrically connected to each other in the through hole 125 via the conductive member 115.

The conductive member 115 may be formed by using various materials. The conductive member 115 may be formed separately from the backlight unit 120, the FPC 110 and the PCB 130. However, embodiments are not limited thereto, e.g., the conductive member 115 may be integrally formed with one of the backlight unit 120, the FPC 110, and the PCB 130.

In the LCD apparatus 100, the electrical connection between the FPC 110 and the PCB 130 may be formed via the at least one through hole 125 of the backlight unit 120, so that an additional member having a large volume may not be necessary to electrically connect the FPC 110 and the PCB 130 to each other. Therefore, the manufacturing procedure of the LCD apparatus 100 may be simplified, the manufacturing costs may be reduced, and the possibility of defect occurrence during the manufacturing procedure may be decreased. Since it may not be necessary to arrange an additional space for the electrical connection between the FPC 110 and the PCB 130, the manufacturing of the LCD apparatus 100 that is thin and light-weighted may be simplified.

The FPC 110 may be bent to enclose, e.g., surround, a side surface of the liquid crystal panel 103, as illustrated in FIG. 2. The bent portion of the FPC 110 may be disposed between the liquid crystal panel 103 and the backlight unit 120, so that an exposure of the FPC 110 may be minimized and damage of the FPC 110 may be minimized and/or prevented. The bent portion of the FPC 110 may include a narrow portion, e.g., the narrow portion may have a lesser width than other portions of the FPC 110. The narrow portion may overlap all of the through holes 125 of the backlight unit 120.

Since the FPC 110 and the PCB 130 may be electrically connected in the at least one through hole 125, which may not be externally exposed, durability of the electrical connection between the FPC 110 and the PCB 130 may be improved.

Figure 5:
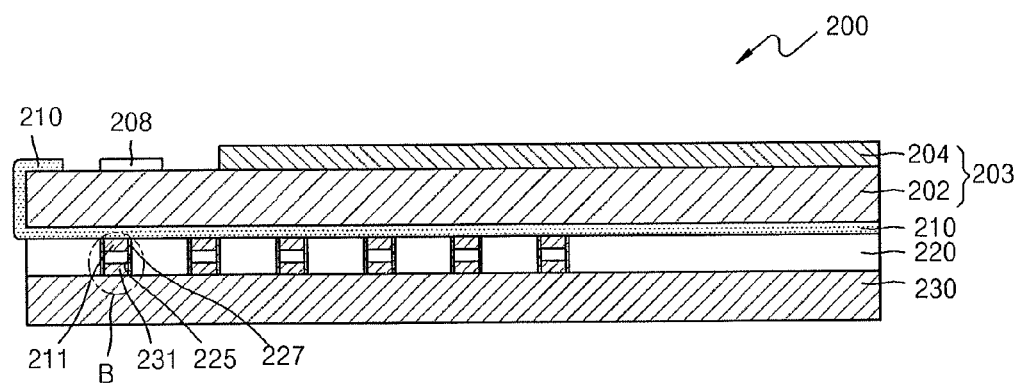
FIG. 5 illustrates a cross-sectional view of an LCD apparatus, according to an exemplary embodiment.
Figure 6:
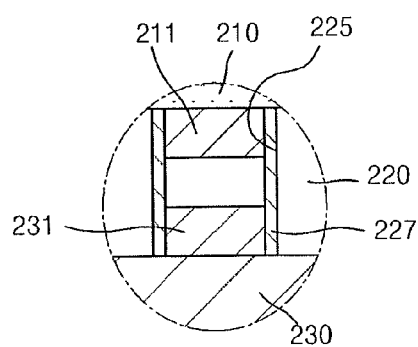
FIG. 6 illustrates a magnified view of a portion B in FIG. 5.

FIG. 5 illustrates a cross-sectional view of an LCD apparatus 200 according to another exemplary embodiment. FIG. 6 illustrates a magnified view of a portion B in FIG. 5.

Referring to FIGS. 5 and 6, the LCD apparatus 200 may include a liquid crystal panel 203, a PCB 230, a backlight unit 220, and a FPC 210. For convenience of description, the present exemplary embodiment will be essentially described with respect to differences from the previous exemplary embodiment.

The liquid crystal panel 203 may include a lower substrate 202, an upper substrate 204, and liquid crystal (not shown). The liquid crystal may be disposed between the lower substrate 202 and the upper substrate 204.

The backlight unit 220 may include a light source unit (not shown) disposed on a bottom surface of the liquid crystal panel 203. The light source unit may generate light. The backlight unit 220 may include a mold frame (not shown) disposed on an outer side of the light source unit. The backlight unit 220 may have at least one through hole 225 therein. For convenience of the manufacturing procedure and the design, the through hole 225 may be formed in the mold frame of the backlight unit 220.

The PCB 230 may be disposed on a bottom surface of the backlight unit 220, that is, the PCB 230 may be disposed on an opposite surface of a surface of the backlight unit 220 that faces the liquid crystal panel 203.

An end of the FPC 210 may be electrically connected to a driving IC 208. The FPC 210 may be bent at a side end of the liquid crystal panel 203 to, e.g., surround the side end of the liquid crystal panel 203. A bent portion of the FPC 210 may be disposed between the liquid crystal panel 203 and the backlight unit 220. The FPC 210 and the PCB 230 may be electrically connected in the at least one through hole 225 of the backlight unit 220.

The electrical connection between the FPC 210 and the PCB 230 will now be described in detail. Referring to FIGS. 5 and 6, a conductive layer 227 may be formed along an inner circumference of each through hole 225. The conductive layer 227 may be on, e.g., directly on, the sidewalls of each through hole 225. At least one first projection part 211 may be formed in an end of the FPC 210, e.g., on a surface of the FPC 210 that faces the backlight unit 220. At least one second projection part 231 may be formed in an end of the PCB 230, e.g., on a second surface of the PCB that faces the backlight unit 220. The first projection part 211 and the second projection part 231 may be formed of a conductive material. The first projection part 211 and the second projection part 231 may be disposed in a corresponding through hole 225. The first projection part 211 and the second projection part 231 may contact, e.g., directly contact, the conductive layer 227 in the corresponding through hole 225. By doing so, the PCB 230 may be electrically connected with the FPC 210.

Referring to FIGS. 5 and 6, the first projection part 211 and the second projection part 231 may be separate, e.g., spaced apart from each other in the corresponding through hole 225. However, embodiments are not limited thereto, e.g., the first projection part 211 and the second projection part 231 may contact each other in the corresponding through hole 225.

In the LCD apparatus 200, the electrical connection between the FPC 210 and the PCB 230 may be formed via the at least one through hole 225 of the backlight unit 220, so that an additional member having a large volume may not be necessary to electrically connect the FPC 210 and the PCB 230. Therefore, the manufacturing procedure of the LCD apparatus 200 may be simplified, the manufacturing costs may be reduced, and the possibility of defect occurrence during the manufacturing procedure may be decreased. Since it may not be necessary to arrange an additional space for the electrical connection between the FPC 210 and the PCB 230, the manufacturing of the LCD apparatus 200 that is thin and light-weighted may be simplified.

The FPC 210 may be bent to enclose, e.g., surround, a side surface of the liquid crystal panel 203. The bent portion of the FPC 210 may be disposed between the liquid crystal panel 203 and the backlight unit 220, so that an exposure of the FPC 210 may be minimized and damage of the FPC 210 may be minimized and/or prevented. The bent portion of the FPC 210 may include a narrow portion, e.g., the narrow portion may have a lesser width than other portions of the FPC 210. The narrow portion may overlap all of the through holes 225 of the backlight unit 220.

Since the FPC 210 and the PCB 230 may be electrically connected in the through hole 225 that is not externally exposed, durability of the electrical connection between the FPC 210 and the PCB 230 may be improved.

Figure 7:
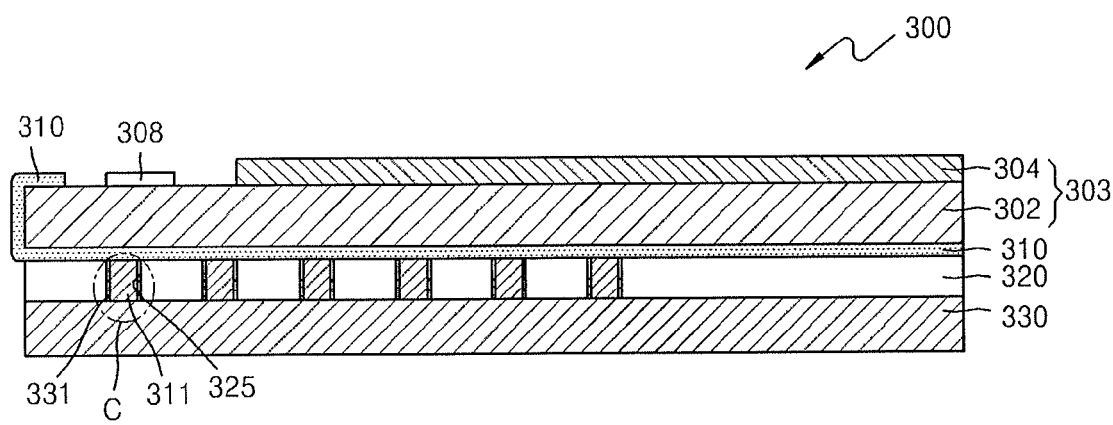
FIG. 7 illustrates a cross-sectional view of an LCD apparatus, according to an exemplary embodiment.
Figure 8:
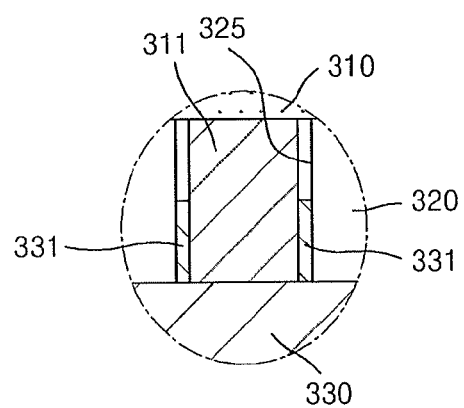
FIG. 8 illustrates a magnified view of a portion C in FIG. 7.

FIG. 7 illustrates a cross-sectional view of an LCD apparatus 300 according to another exemplary embodiment. FIG. 8 illustrates a magnified view of a portion C in FIG. 7.

Referring to FIGS. 7 and 8, the LCD apparatus 300 may include a liquid crystal panel 303, a PCB 330, a backlight unit 320, and a FPC 310. For convenience of description, the present exemplary embodiment will be essentially described with respect to differences from the previous exemplary embodiments.

The liquid crystal panel 303 may include a lower substrate 302, an upper substrate 304, and liquid crystal (not shown) disposed between the lower substrate 302 and the upper substrate 304.

The backlight unit 320 may include a light source unit (not shown) disposed on a bottom surface of the liquid crystal panel 303. The light source unit may generate light. The backlight unit 320 may include a mold frame (not shown) disposed on an outer side of the light source unit. The backlight unit 320 may have at least one through hole 325 therein. For convenience of the manufacturing procedure and the design, the at least one through hole 325 may be formed in the mold frame of the backlight unit 320.

The PCB 330 may be disposed on a bottom surface of the backlight unit 320, that is, the PCB 330 may be disposed on an opposite surface of a surface of the backlight unit 320 which faces the liquid crystal panel 303.

An end of the FPC 310 may be electrically connected to a driving IC 308. The FPC 310 may be bent at a side end of the liquid crystal panel 303, e.g., to surround the side end of the liquid crystal panel 303. A bent portion of the PFC 310 may be disposed between the liquid crystal panel 303 and the backlight unit 320. The FPC 310 and the PCB 330 may be electrically connected in the at least one through hole 325 of the backlight unit 320.

The electrical connection between the FPC 310 and the PCB 330 will now be described in detail. Referring to FIGS. 7 and 8, a projection part 311 may be formed in an end of the FPC 310, e.g., on a surface of the FPC 310 that faces the backlight unit 320. A slot 331 may be formed in an end of the PCB 330, e.g., on a surface of the PCB 330 that faces the backlight unit 320. The projection part 311 and the slot 331 may be formed of a conductive material. The projection part 311 and the slot 331 may be disposed in a corresponding through hole 325. The projection part 311 may be combined with the slot 331 in the corresponding through hole 325. For example, the slot 331 may be formed to enclose a side end of the projection part 311, so that an inner circumference of the slot 331 contacts the projection part 311. By doing so, the projection part 311 may be combined with the slot 331, so that the PCB 330 may be electrically connected with the FPC 310.

In the LCD apparatus 300, the electrical connection between the FPC 310 and the PCB 330 may be formed via the at least one through hole 325 of the backlight unit 320, so that an additional member having a large volume may not be necessary to electrically connect the FPC 310 and the PCB 330. Therefore, the manufacturing procedure of the LCD apparatus 300 may be simplified, the manufacturing costs may be reduced, and the possibility of defect occurrence during the manufacturing procedure may be decreased. Since it may not be necessary to arrange an additional space for the electrical connection between the FPC 310 and the PCB 330, the manufacturing of the LCD apparatus 300 that is thin and light-weighted may be simplified.

The FPC 310 may be bent to enclose, e.g., surround, a side surface of the liquid crystal panel 303. The bent portion of the FPC 310 may be disposed between the liquid crystal panel 303 and the backlight unit 320, so that an exposure of the FPC 310 may be minimized and damage of the FPC 310 may be minimized and/or prevented. The bent portion of the FPC 310 may include a narrow portion, e.g., the narrow portion may have a lesser width than other portions of the FPC 310. The narrow portion may overlap all of the through holes 325 of the backlight unit 320.

Since the FPC 310 and the PCB 330 may be electrically connected in the through hole 325 that is not externally exposed, durability of the electrical connection between the FPC 310 and the PCB 330 may be improved.

Figure 9:
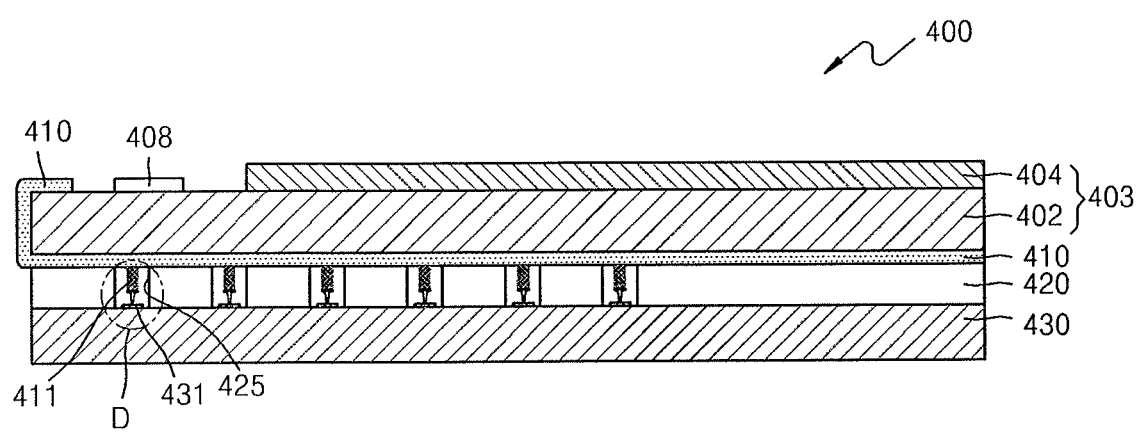
FIG. 9 illustrates a cross-sectional view of an LCD apparatus, according to an exemplary embodiment.
Figure 10:
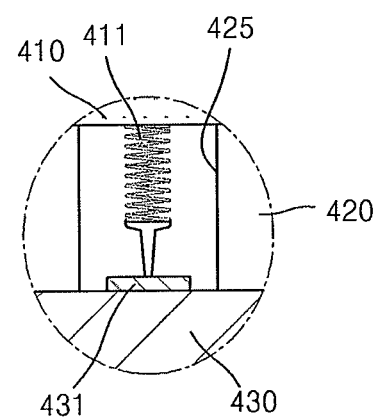
FIG. 10 illustrates a magnified view of a portion D in FIG. 9.

FIG. 9 illustrates a cross-sectional view of an LCD apparatus 400 according to an exemplary embodiment. FIG. 10 illustrates a magnified view of a portion D in FIG. 9.

Referring to FIGS. 9 and 10, the LCD apparatus 400 may include a liquid crystal panel 403, a PCB 430, a backlight unit 420, and a FPC 410. For convenience of description, the present exemplary embodiment will be essentially described with respect to differences from the previous exemplary embodiments.

The liquid crystal panel 403 may include a lower substrate 402, an upper substrate 404, and liquid crystal (not shown). The liquid crystal may be disposed between the lower substrate 402 and the upper substrate 404.

The backlight unit 420 may include a light source unit (not shown) disposed on a bottom surface of the liquid crystal panel 403. The light source unit may generate light. The backlight unit 420 may include a mold frame (not shown) disposed on an outer side of the light source unit. The backlight unit 420 may have at least one through hole 425. For convenience of the manufacturing procedure and the design, the at least one through hole 425 may be formed in the mold frame of the backlight unit 420.

The PCB 430 may be disposed on a bottom surface of the backlight unit 420, that is, the PCB 430 may be disposed on an opposite surface of a surface of the backlight unit 420 which faces the liquid crystal panel 403.

An end of the FPC 410 may be electrically connected to a driving IC 408. The FPC 410 may be bent at a side end of the liquid crystal panel 403 to, e.g., surround the side end of the liquid crystal panel 403. A bent portion of the FPC 410 may be disposed between the liquid crystal panel 403 and the backlight unit 420. The FPC 410 and the PCB 430 are electrically connected in the at least one through hole 425 of the backlight unit 420.

The electrical connection between the FPC 410 and the PCB 430 will now be described in detail. Referring to FIGS. 9 and 10, an elastic member 411 may be formed in an end of the FPC 410, e.g., on a surface of the FPC 410 that faces the backlight unit 420. A pad 431 may be formed in an end of the PCB 430, e.g., on a surface of the PCB 430 that faces the backlight unit 420. The elastic member 411 and the pad 431 may be formed of a conductive material. The elastic member 411 and the pad 431 may be disposed in a corresponding through hole 425. The elastic member 411 may contact the pad 431. The elastic member 411 may be formed as, e.g., a spring having a pin-shaped tip. The elastic member 411 may firmly contact the pad 431 due to its elasticity. A shape of the elastic member 411 is not limited thereto, e.g., the elastic member 411 may have one of various shapes so as to stably contact the pad 431. The elastic member 411 may contact the pad 431, so that the PCB 430 may be electrically connected with the FPC 410.

In the LCD apparatus 400, the electrical connection between the FPC 410 and the PCB 430 may be formed via the at least one through hole 425 of the backlight unit 420, so that an additional member having a large volume may not be necessary to electrically connect the FPC 410 and the PCB 430. Therefore, the manufacturing procedure of the LCD apparatus 400 may be simplified, the manufacturing costs may be reduced, and the possibility of defect occurrence during the manufacturing procedure may be decreased. Since it may not be necessary to arrange an additional space for the electrical connection between the FPC 410 and the PCB 430, the manufacturing of the LCD apparatus 400 that is thin and light-weighted may be simplified.

The FPC 410 may be bent to enclose, e.g., surround, a side surface of the liquid crystal panel 403. The bent portion of the FPC 410 may be disposed between the liquid crystal panel 403 and the backlight unit 420, so that an exposure of the FPC 410 may be minimized and damage of the FPC 410 may be minimized and/or prevented. The bent portion of the FPC 410 may include a narrow portion, e.g., the narrow portion may have a lesser width than other portions of the FPC 410. The narrow portion may overlap all of the through holes 425 of the backlight unit 420.

Since the FPC 410 and the PCB 430 may be electrically connected in the at least one through hole 425 that is not externally exposed, durability of the electrical connection between the FPC 410 and the PCB 430 may be improved.

In the exemplary embodiments of the LCD apparatus, the FPC and the PCB may be easily connected. Also, the manufacturing feature of the LCD apparatus may be improved.

By way of summation and review, an LCD apparatus may include a liquid crystal panel, a backlight unit, a flexible printed circuit (FPC) and a printed circuit board (PCB). The liquid crystal panel may have two substrates and liquid crystal disposed between the two substrates. The backlight unit may have a light source that emits light to liquid crystal molecules.

The PCB may generate various signals so as to, e.g., drive the liquid crystal panel. The signals from the PCB may be applied to the liquid crystal panel via, e.g., a driving integrated circuit (IC) formed in the liquid crystal panel. The FPC may connect the PCB and the driving IC so as to allow a driving signal to be delivered. However, a process for connecting the FPC and PCB may be difficult such that there is limitation in improving the manufacturing feature of the LCD apparatus.

Embodiments, e.g., the exemplary embodiments discussed above, relate to a LCD apparatus in which a flexible printed circuit (FPC) and a printed circuit board (PCB) are easily connected.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display (LCD) apparatus, comprising:
   a liquid crystal panel;
   a printed circuit board (PCB) that generates a driving signal to drive the liquid crystal panel;

a backlight unit between the liquid crystal panel and the PCB, the backlight unit having a through hole formed therein; and a flexible printed circuit (FPC) electrically connected to a driving integrated circuit (IC) of the liquid crystal panel and electrically connected to the PCB in the through hole, the FPC being bent at a side surface of the liquid crystal panel, and a bent portion of the FPC being between the liquid crystal panel and the backlight unit and overlapping an entire top of the through hole.

2. The LCD apparatus of claim 1, wherein the through hole overlaps a predetermined portion of the PCB and overlaps a predetermined portion of the FPC.

3. The LCD apparatus of claim 1, further comprising a conductive member in the through hole, the conductive member consisting essentially of a conductive material and contacting the FPC and the PCB.

4. The LCD apparatus of claim 3, wherein the conductive member is formed separately from the FPC, the backlight unit, and the PCB.

5. The LCD apparatus of claim 3, wherein the conductive member is integrally formed with one of the FPC, the backlight unit, and the PCB.

6. The LCD apparatus of claim 1, further comprising:
a conductive layer extending along an inner circumference of the through hole,
a first projection part including a first conductive material, the first projection part contacting the conductive layer at an end of the FPC so as to correspond to the through hole, and
a second projection part including a second conductive material, the second projection part contacting the conductive layer at an end of the PCB so as to correspond to the through hole.

7. The LCD apparatus of claim 6, wherein the first projection part and the second projection part are in the through hole and contact the conductive layer.

8. The LCD apparatus of claim 1, further comprising:
a projection part including a conductive material at an end of the FPC so as to correspond to the through hole, and
a slot including a conductive material at an end of the PCB so as to correspond to the through hole, the slot being combined with the projection part in the through hole.

9. The LCD apparatus of claim 1, further comprising:
an elastic member including a first conductive material, the elastic member being at an end of the FPC so as to correspond to the through hole, and
a pad including a second conductive material, the pad being at an end of the PCB so as to correspond to the through hole, and the pad contacting the elastic member in the through hole.

10. The LCD apparatus of claim 1, wherein the backlight unit includes a light source unit and a mold frame, the through hole being formed in the mold frame.

11. The LCD apparatus of claim 1, wherein the liquid crystal panel includes:
an upper substrate;
a lower substrate longer than the upper substrate, the lower substrate being between the upper substrate and the backlight unit; and the driving IC on an upper surface of the lower substrate, the upper surface of the lower substrate facing the upper substrate, and the FPC extending along the upper, lateral, and lower surfaces of the lower substrate.

12. The LCD apparatus of claim 11, wherein the FPC is in direct contact with the upper, lateral, and lower surfaces of the lower substrate.

13. The LCD apparatus of claim 11, wherein the FPC is in direct contact with the lower surface of the liquid crystal panel and with an upper surface of the backlight unit, the upper surface of the backlight unit facing the liquid crystal panel and surrounding the through hole.

14. The LCD apparatus of claim 11, wherein a portion of the FPC in direct contact with the upper surface of the lower substrate is in a non-overlapping relationship with the through hole in the backlight unit.

15. The LCD apparatus of claim 1, wherein a portion of the FPC extends continuously along an entire width of a surface of the liquid crystal panel facing the backlight unit.

16. The LCD apparatus of claim 15, wherein the portion of the FPC overlaps a plurality of through holes in the backlight unit.

17. A liquid crystal display (LCD) apparatus, comprising:
a liquid crystal panel;
a printed circuit board (PCB) that generates a driving signal to drive the liquid crystal panel;
a backlight unit between the liquid crystal panel and the PCB, the backlight unit having a through hole formed therein; and
a flexible printed circuit (FPC) electrically connected to a driving integrated circuit (IC) of the liquid crystal panel and electrically connected to the PCB in the through hole, the FPC being bent at a side surface of the liquid crystal panel, and a bent portion of the FPC being between the liquid crystal panel and the backlight unit,
wherein the FPC is in direct contact with a surface of the backlight unit facing the liquid crystal panel, the surface of the backlight unit surrounding the through hole.

18. A liquid crystal display (LCD) apparatus, comprising:
a liquid crystal panel;
a printed circuit board (PCB) that generates a driving signal to drive the liquid crystal panel;
a backlight unit between the liquid crystal panel and the PCB, the backlight unit having a through hole formed therein; and
a flexible printed circuit (FPC) electrically connected to a driving integrated circuit (IC) of the liquid crystal panel and electrically connected to the PCB in the through hole, wherein a depth of the through hole in the backlight unit equals a thickness of the backlight unit, the through hole including a conductor extending only from a top of the through hole to a bottom of the through hole.

19. The LCD apparatus of claim 1, wherein the bent portion of the FPC is between facing surfaces of the liquid crystal panel and the backlight unit, respectively, the bent portion of the FPC extending along a direction perpendicular to a depth of the through hole.

* * * * *